(12) United States Patent
Kamata

(10) Patent No.: US 11,339,269 B2
(45) Date of Patent: May 24, 2022

(54) RESIN COMPOSITION FOR FORMING VARISTOR AND VARISTOR

(71) Applicant: NAMICS CORPORATION, Niigata (JP)

(72) Inventor: Yoshitaka Kamata, Niigata (JP)

(73) Assignee: NAMICS CORPORATION, Niigata (JP)

(*) Notice: Subject to any disclaimer, the term of this patent is extended or adjusted under 35 U.S.C. 154(b) by 8 days.

(21) Appl. No.: 16/770,699

(22) PCT Filed: Dec. 4, 2018

(86) PCT No.: PCT/JP2018/044467
§ 371 (c)(1),
(2) Date: Jun. 8, 2020

(87) PCT Pub. No.: WO2019/116955
PCT Pub. Date: Jun. 20, 2019

(65) Prior Publication Data
US 2021/0155769 A1 May 27, 2021

(30) Foreign Application Priority Data

Dec. 12, 2017 (JP) .............................. JP2017-237661

(51) Int. Cl.
*C08K 3/04* (2006.01)
*C08K 5/09* (2006.01)
(Continued)

(52) U.S. Cl.
CPC ................ *C08K 3/041* (2017.05); *C08K 5/09* (2013.01); *C08L 63/00* (2013.01); *H01C 7/10* (2013.01);
(Continued)

(58) Field of Classification Search
CPC .... C08J 5/18; C08J 3/28; C08G 59/50; H01B 1/24
See application file for complete search history.

(56) References Cited

U.S. PATENT DOCUMENTS 10,141,090 B2 11/2018 Kamata et al.
2010/0090178 A1 4/2010 Kosowsky et al.
(Continued)

FOREIGN PATENT DOCUMENTS

CN 106009029 A 10/2016
JP 2010095702 A 4/2010
(Continued)

OTHER PUBLICATIONS

International Search Report (ISR) (and English translation thereof) dated Mar. 12, 2019 issued in International Application No. PCT/JP2018/044467.
(Continued)

*Primary Examiner* — Khanh T Nguyen
(74) *Attorney, Agent, or Firm* — Holtz, Holtz & Volek PC

(57) ABSTRACT

Provided are a resin composition for forming a varistor and a varistor capable of increasing freedom in the design of substrates, ICs, or electronics. The resin composition for forming a varistor includes (A) an epoxy resin, (B) a curing agent, (C) carbon nanotubes, and (D) a dispersant. The (C) carbon nanotubes may be single-walled carbon nanotubes, multi-walled carbon nanotubes, or a combination thereof. The (D) dispersant includes a polyalkyl oxide surfactant. The polyalkyl oxide surfactant has a polyalkyl ether skeleton in the molecule.

9 Claims, 9 Drawing Sheets

(51) Int. Cl.
*C08L 63/00* (2006.01)
*H01C 7/10* (2006.01)
(52) U.S. Cl.
CPC .. *C08K 2201/001* (2013.01); *C08K 2201/011* (2013.01)

(56) References Cited

U.S. PATENT DOCUMENTS

| | | |
|---|---|---|
| 2010/0221517 A1 | 9/2010 | Swift et al. |
| 2010/0270588 A1 | 10/2010 | Kosowsky et al. |
| 2011/0062388 A1 | 3/2011 | Kosowsky et al. |
| 2012/0172495 A1 | 7/2012 | Czubarow et al. |
| 2012/0202930 A1 | 8/2012 | Kosowsky et al. |
| 2016/0247594 A1* | 8/2016 | Nakai ..................... H01B 1/24 |
| 2016/0307674 A1 | 10/2016 | Hoehn et al. |

FOREIGN PATENT DOCUMENTS

| | | | |
|---|---|---|---|
| JP | 2010521058 A | 6/2010 | |
| JP | 2010206202 A | 9/2010 | |
| JP | 2012504870 A | 2/2012 | |
| JP | 2013504684 A | 2/2013 | |
| JP | 2014177539 A * | 9/2014 | ............. C08G 59/50 |
| KR | 101034766 B1 * | 6/2011 | ................ C08J 3/28 |
| WO | 2015082498 A2 | 6/2015 | |

OTHER PUBLICATIONS

Written Opinion dated Mar. 12, 2019 issued in International Application PCT/JP2018/044467.

\* cited by examiner

RESIN COMPOSITION FOR FORMING VARISTOR AND VARISTOR

FIELD OF THE INVENTION

The present invention relates to a resin composition for forming a varistor and a varistor.

BACKGROUND ART

Patent document 1 describes an underfill material containing an epoxy resin, a curing agent and carbon nanotubes. It is described that the carbon nanotubes contained in this underfill material are single-walled carbon nanotubes or multi-walled carbon nanotubes.

PRIOR ART REFERENCES

Patent Document

Patent document 1: JP 2013-504684 A

SUMMARY OF THE INVENTION

A varistor is an electronic component having a pair of electrodes, and characteristically exhibits a high electrical resistance when the voltage between the pair of electrodes is low, and sharply lowers the electrical resistance when the voltage between the pair of electrodes reaches or exceeds a predetermined value. In general, a varistor has a structure in which a material having nonlinear resistance characteristics is arranged between a pair of electrodes. Semiconductor ceramics such as silicon carbide, zinc oxide and strontium titanate are used as such materials having nonlinear resistance characteristics. Varistors are used for purposes such as (1) to protect electronic devices from lightning surges, (2) to protect ICs from abnormal signal voltages, and (3) to protect electronic devices from electro-static discharge (ESD) caused by human body.

Conventional varistors have a problem in that they reduce the degree of freedom in designing substrates, ICs or electronic devices. That is, when a varistor with a non-linear resistance material between a pair of electrodes is mounted on a substrate, IC, or electronic device, the degree of freedom in the design of the substrate, IC, or electronic device becomes low because the design needs to take the mounting into account.

An object of the present invention is to provide a resin composition for forming a varistor and a varistor that can increase the degree of freedom in the design of substrates, ICs, or electronic devices.

Approaches to solving the above problems are as follows.

(1) A resin composition for forming a varistor comprising (A) an epoxy resin, (B) a curing agent, (C) carbon nanotubes and (D) a dispersant.

(2) The resin composition for forming a varistor described in (1), wherein the epoxy resin (A) comprises at least one selected from the group consisting of bisphenol A epoxy resins, brominated bisphenol A epoxy resins, bisphenol F epoxy resins, aminophenol epoxy resins, biphenyl epoxy resins, novolak epoxy resins, alicyclic epoxy resins, naphthalene epoxy resins, ether epoxy resins, polyether epoxy resins and silicone epoxy copolymer resins.

(3) The resin composition for forming a varistor described in (1) or (2), wherein the curing agent (B) comprises at least one selected from the group consisting of amine compounds, phenols, acid anhydrides and imidazole compounds.

(4) The resin composition for forming a varistor described in anyone of (1) to (3), wherein the carbon nanotubes (C) comprise single-walled carbon nanotubes, multi-walled carbon nanotubes, or a combination thereof.

(5) The resin composition for forming a varistor described in any one of (1) to (3), wherein the carbon nanotubes (C) comprise isolated single-walled semiconducting carbon nanotubes.

(6) The resin composition for forming a varistor described in anyone of (1) to (5), wherein the resin composition includes the carbon nanotubes (C) in an amount of 0.05 to 2 parts by weight with respect to 100 parts by weight of the epoxy resin (A).

(7) The resin composition for forming a varistor described in anyone of (1) to (6), wherein the dispersant (D) comprises at least one selected from the group consisting of anionic surfactants, cationic surfactants, amphoteric surfactants, nonionic surfactants, hydrocarbon surfactants, fluorine surfactants, silicon surfactants, polycarboxylic acids, polyether carboxylic acids, polycarboxylic acid salts, alkylsulfonic acid salts, alkylbenzenesulfonic acid salts, alkyl ether sulfonic acid salts, aromatic polymers, organic conductive polymers, polyalkyl oxide surfactants, inorganic salts, organic acid salts and aliphatic alcohols.

(8) The resin composition for forming a varistor described in (7), wherein the dispersant (D) comprises a polyalkyl oxide surfactant, and the polyalkyl oxide surfactant has a polyalkyl ether skeleton in the molecule.

(9) A varistor comprising a cured product of the resin composition for forming a varistor described in any one of (1) to (8).

The present invention may provide a resin compositions for forming a varistors and a varistor that can increase the degree of freedom in the design of substrates, ICs, or electronic devices.

MODE FOR CARRYING OUT THE INVENTION

Figure 1:
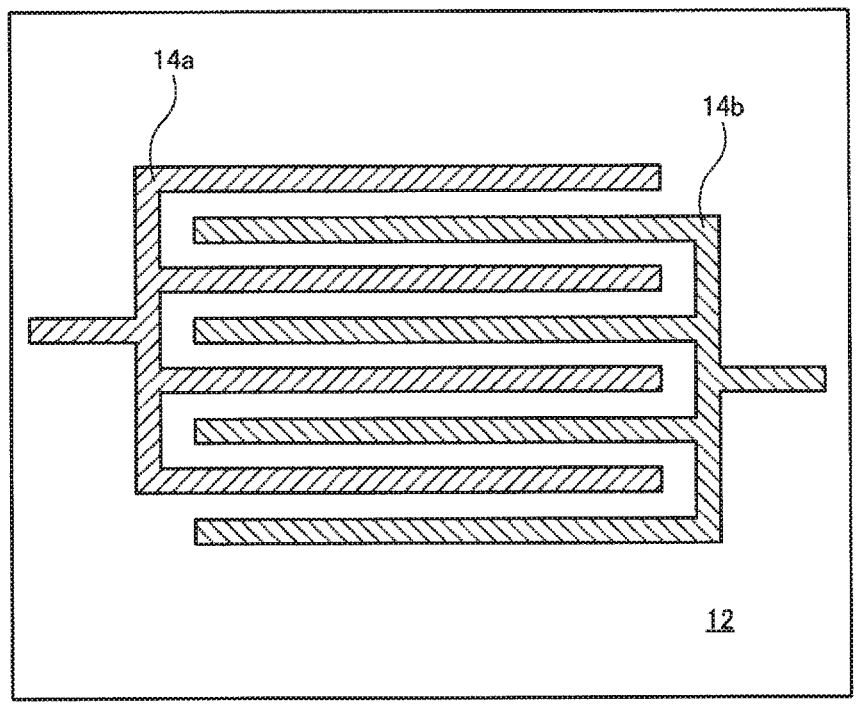
FIG. 1 is a plan view of a pair of electrodes.

Embodiments of the present invention will be described hereinbelow. A resin composition for forming a varistor according to an embodiment is used for the manufacturing of a varistor which is an electronic element.

A varistor is an electronic element with nonlinear resistance characteristics, and has a pair of electrodes. The relationship between the voltage V applied between the pair of electrodes and the current I flowing between the pair of electrodes is approximated as $I=K \cdot V^{\alpha}$ (K is a constant). $\alpha$ is called the nonlinear coefficient. $\alpha=1$ in usual ohmic resistors, but $\alpha>1$ in varistors.

The resin composition for forming a varistor according to the present embodiment includes (A) an epoxy resin, (B) a curing agent, (C) carbon nanotubes and (D) a dispersant. These components will be described hereinbelow.

The epoxy resin (A) preferably comprises at least one selected from the group consisting of bisphenol A epoxy resins, brominated bisphenol A epoxy resins, bisphenol F epoxy resins, aminophenol epoxy resins, biphenyl epoxy resins, novolak epoxy resins, alicyclic epoxy resins, naphthalene epoxy resins, ether epoxy resins, polyether epoxy resins and silicone epoxy copolymer resins. More preferably, the epoxy resin (A) comprises at least one selected from the group consisting of bisphenol A epoxy resins, bisphenol F epoxy resins and aminophenol epoxy resins.

The curing agent (B) preferably comprises at least one selected from the group consisting of amine compounds, phenols, acid anhydrides and imidazole compounds. More preferably, the curing agent (B) comprises an imidazole compound.

Examples of the imidazole compounds include imidazole and imidazole derivatives. When the resin composition for forming a varistor of the present embodiment includes an imidazole compound, a varistor having a high nonlinear coefficient $\alpha$ can be obtained. When the resin composition for forming a varistor of the present embodiment includes both an imidazole compound and an amine compound, a varistor with a higher nonlinear coefficient $\alpha$ can be obtained.

Examples of the amine compounds include aliphatic amines, alicyclic amines, aromatic amines, 3,3'-diethyl-4,4'-diaminodiphenylmethane and diethyltoluenediamine. Preferably, the amine compound is 3,3'-diethyl-4,4'-diaminodiphenylmethane and/or diethyltoluenediamine. 3,3'-Diethyl-4,4'-diaminodiphenylmethane is an aromatic amine curing agent, and is commercially available as, for example, "KAYAHARD A-A" (manufactured by Nippon Kayaku Co., Ltd.). Diethyltoluenediamine is commercially available as, for example, "ETHACURE" (manufactured by Albemarle).

When the resin composition for forming a varistor of the present embodiment includes an imidazole compound, the content of the imidazole compound is preferably 1 to 20% by weight, more preferably 2 to 15% by weight, and still more preferably 5 to 10% by weight.

The carbon nanotubes (C) are a material in the shape of coaxial tubes each formed of a network of 6-membered carbon rings. Single-walled and multi-walled carbon nanotubes are known. The carbon nanotubes can be classified into metallic carbon nanotubes and semiconducting carbon nanotubes depending on their electric properties. The carbon nanotubes (C) contained in the resin composition for forming a varistor of the present embodiment are preferably single-walled semiconducting carbon nanotubes.

The content of the carbon nanotubes (C) is preferably 0.05 to 2 parts by weight, more preferably 0.1 to 1 part by weight, and still more preferably 0.12 to 0.6 parts by weight with respect to 100 parts by weight of the epoxy resin (A).

The dispersant (D) preferably comprises a surfactant. For example, the dispersant (D) preferably comprises at least one selected from the group consisting of anionic surfactants, cationic surfactants, amphoteric surfactants, nonionic surfactants, hydrocarbon surfactants, fluorine surfactants, silicon surfactants, polycarboxylic acids, polyether carboxylic acids, polycarboxylic acid salts, alkylsulfonic acid salts, alkylbenzenesulfonic acid salts, alkyl ether sulfonic acid salts, aromatic polymers, organic conductive polymers, polyalkyl oxide surfactants, inorganic salts, organic acid salts and aliphatic alcohols.

The dispersant (D) preferably comprises a polyalkyl oxide surfactant. Examples of the polyalkyl oxide surfactants include EO/PO block copolymer surfactants. The EO/PO block copolymer surfactants are surfactants including a polyoxyethylene (EO)-polyoxypropylene (PO) condensate. The structural formula of the polyoxyethylene-polyoxypropylene condensate is as shown in the following formula (1).

$$—(C_3H_6O)_a—(C_2H_4O)_b— \quad (1)$$

The dispersant (D) may comprise a surfactant having a polyalkyl ether skeleton in the molecule. The structural formula of the polyalkyl ether skeleton is as shown in the following formula (2).

$$-(AO)_a— \quad (2)$$

(AO: Alkyl oxide such as ethylene oxide or propylene oxide)

The resin composition for forming a varistor of the present embodiment may further include a solvent. Examples of the solvents include aromatic hydrocarbons such as toluene and xylene; ketones such as methyl ethyl ketone, methyl isobutyl ketone and cyclohexanone; ethylene glycol monomethyl ether, ethylene glycol monoethyl ether, ethylene glycol monobutyl ether, propylene glycol monomethyl ether, propylene glycol monoethyl ether, propylene glycol monobutyl ether, diethylene glycol monomethyl ether, diethylene glycol monoethyl ether, diethylene glycol monobutyl ether, and esters, e.g., acetate esters, corresponding to the above ethers; and terpineol. The content of the solvent contained in the resin composition for forming a varistor is preferably 2 to 10% by weight.

The resin composition for forming a varistor of the present embodiment may further include at least one additive selected from the group consisting of coloring agents (such as inorganic pigments and organic pigments), ion-trapping agents, flame retardants, silane coupling agents, leveling agents, thixotropic agents, elastomers, curing accelerators, metal complexes and anti-foaming agents.

The resin composition for forming a varistor of the present embodiment may be produced by mixing the epoxy resin (A), the curing agent (B), the carbon nanotubes (C), the dispersant (D), and other optional components (such as additives). The mixing may be performed using a known mixer such as a planetary stirring machine, a dissolver, a bead mill, a grinding kneader, a three-roll mill, a rotary mixer or a twin-screw mixer.

The resin composition for forming a varistor of the present embodiment may be applied to a substrate by, for example, screen printing, dipping or the like.

After the resin composition for forming a varistor of the present embodiment is applied to a substrate, the substrate may be heated at, for example, 100° C. to 200° C. to form a cured product. The present inventors have found that this cured product has excellent varistor characteristics. In particular, a cured product having excellent varistor characteristics can be obtained by mixing an epoxy resin with carbon nanotubes and a dispersant.

A method for producing a varistor of the present embodiment includes, for example, the following steps.

(1) A pair of electrodes is formed on a substrate.

(2) The resin composition for forming a varistor of the present embodiment is applied between the pair of electrodes by screen printing or the like.

(3) The substrate coated with the resin composition for forming a varistor is heated at, for example, 100° C. to 200° C.

By using the resin composition for forming a varistor of the present embodiment, a varistor having a high nonlinear coefficient α may be produced.

Varistors may be formed by applying the resin composition for forming a varistor of the present embodiment to substrates by screen printing or the like, and thereafter heating the resin composition for forming a varistor that has been applied. The use of the resin composition for forming a varistor of the present embodiment eliminates the need of mounting varistors on substrates or ICs, and thus can increase the degree of freedom in designing of substrates, ICs or electronic devices.

Examples

Hereinbelow, Examples of the present invention will be described. The scope of the present invention is not limited to such Examples.

<Preparation of a Resin Composition for Forming a Varistor>

Resin compositions for forming a varistors were prepared using the following components (A) to (D).

(A) Epoxy Resins

The following three types of epoxy resins (A1, A2 and A3) were used.

(A1)

An epoxy resin obtained by mixing 60% by weight of a bisphenol F epoxy resin and 40% by weight of a bisphenol A epoxy resin.

The bisphenol F epoxy resin used here was "YDF-8170" manufactured by Nippon Steel & Sumikin Chemical Co., Ltd.

The bisphenol A epoxy resin used here was "jER1001" manufactured by Mitsubishi Chemical Corporation.

(A2)

Bisphenol F epoxy resin ("YDF-8170" manufactured by Nippon Steel & Sumikin Chemical Co., Ltd.).

(A3)

Aminophenol epoxy resin ("jER630" manufactured by Mitsubishi Chemical Corporation).

(B) Curing Agents

The following four types of curing agents (B1, B2, B3 and B4) were used.

(B1)

Amine curing agent, 3,3'-diethyl-4,4'-diaminodiphenylmethane ("KAYAHARD A-A (HDAA)" manufactured by Nippon Kayaku Co., Ltd.).

(B2)

Imidazole curing agent ("2P4MHZ-PW" manufactured by SHIKOKU CHEMICALS CORPORATION).

(B3)

Phenol ("MEH-8005" manufactured by MEIWA PLASTIC INDUSTRIES, LTD.).

(B4)

Acid anhydride ("YH307" manufactured by Mitsubishi Chemical Corporation).

(C) Carbon Nanotubes

The following two types of carbon nanotubes (C1 and C2) were used. Further, carbon black (C3) was used as a comparative example.

(C1)

Single-walled carbon nanotubes ("PD1.5L15-S" manufactured by NANOLAB Inc.).

(C2)

Multi-walled carbon nanotubes ("PD15L1-5" manufactured by NANOLAB Inc.).

(C3)

Carbon black ("EC600JD" manufactured by Lion Specialty Chemicals Co., Ltd.).

(D) Dispersants

The following four types of dispersants (D1, D2, D3 and D4) were used.

(D1)

Polyether carboxylic acid ("HIPLAAD ED 350" manufactured by Kusumoto Chemicals, Ltd.).

(D2)

Polyether carboxylic acid ("HIPLAAD ED 451" manufactured by Kusumoto Chemicals, Ltd.).

(D3)

Polyoxyethylene polyoxypropylene glycol ("ADEKA PLURONIC L-44" manufactured by ADEKA CORPORATION).

(D4)

Polyoxyethylene polyoxypropylene glycol ("ADEKA PLURONIC L-64" manufactured by ADEKA CORPORATION).

Resin compositions of Examples 1 to 15 and Comparative Examples 1 to 4 were prepared by mixing the components (A) to (D) in the proportions shown in Tables 1 to 3 below. The proportions of the components shown in Tables 1 to 3 are all parts by weight with respect to the content of the epoxy resin taken as 100 parts by weight.

TABLE 1

| | | Examples | | | | | | | |
|---|---|---|---|---|---|---|---|---|---|
| | | 1 | 2 | 3 | 4 | 5 | 6 | 7 | 8 |
| (A) Epoxy resins | A1 | 100.0 | 100.0 | 100.0 | 100.0 | 100.0 | 100.0 | 100.0 | 100.0 |
| | A2 | | | | | | | | |
| | A3 | | | | | | | | |
| (B) Curing agents | B1 | 32.08 | 32.08 | 32.08 | 32.08 | 32.08 | 32.08 | 32.08 | 32.08 |
| | B2 | 10.00 | 10.00 | 10.00 | 10.00 | 10.00 | 10.00 | 10.00 | 10.00 |
| | B3 | | | | | | | | |
| | B4 | | | | | | | | |
| (C) Carbon nanotubes | C1 | 0.17 | 0.17 | 0.17 | 0.17 | 0.17 | 0.17 | 0.07 | 0.34 |
| | C2 | | | | | | | | |
| Carbon black | C3 | | | | | | | | |

TABLE 1-continued

|  |  | Examples | | | | | | | |
|---|---|---|---|---|---|---|---|---|---|
|  |  | 1 | 2 | 3 | 4 | 5 | 6 | 7 | 8 |
| (D) Dispersants | D1 | 0.85 |  |  |  | 0.17 | 1.70 | 0.35 | 1.70 |
|  | D2 |  | 0.85 |  |  |  |  |  |  |
|  | C3 |  |  | 0.85 |  |  |  |  |  |
|  | C4 |  |  |  | 0.85 |  |  |  |  |
| Value of α |  | 10.0 | 10.0 | 10.5 | 10.5 | 10.0 | 10.0 | 10.5 | 9.5 |

TABLE 2

|  |  | Examples | | | | | | |
|---|---|---|---|---|---|---|---|---|
|  |  | 9 | 10 | 11 | 12 | 13 | 14 | 15 |
| (A) Epoxy resins | A1 | 100.0 | 100.0 | 100.0 | 100.0 | 100.0 |  |  |
|  | A2 |  |  |  |  |  | 100.0 |  |
|  | A3 |  |  |  |  |  |  | 100.0 |
| (B) Curing agents | B1 | 32.08 | 32.08 |  |  |  | 43.65 | 71.64 |
|  | B2 | 10.00 | 10.00 | 10.01 | 10.01 | 10.00 | 10.00 | 10.01 |
|  | B3 |  |  |  | 62.23 |  |  |  |
|  | B4 |  |  | 48.35 |  |  |  |  |
| (C) Carbon nanotubes | C1 | 1.14 |  | 0.19 | 0.21 | 0.13 | 0.18 | 0.22 |
|  | C2 |  | 0.34 |  |  |  |  |  |
| Carbon black | C3 |  |  |  |  |  |  |  |
| (D) Dispersants | D1 | 5.70 | 1.70 | 0.95 | 1.05 | 0.65 | 0.90 | 1.10 |
|  | D2 |  |  |  |  |  |  |  |
|  | C3 |  |  |  |  |  |  |  |
|  | C4 |  |  |  |  |  |  |  |
| Value of α |  | 7.5 | 10.0 | 7.7 | 7.1 | 7.5 | 10.0 | 10.3 |

TABLE 3

|  |  | Comparative Examples | | | |
|---|---|---|---|---|---|
|  |  | 1 | 2 | 3 | 4 |
| (A) Epoxy resins | A1 | 100.0 | 100.0 | 100.0 | 100.0 |
|  | A2 |  |  |  |  |
|  | A3 |  |  |  |  |
| (B) Curing agents | B1 | 32.08 | 32.08 | 32.08 | 32.08 |
|  | B2 | 10.00 | 10.00 | 10.00 | 10.00 |
|  | B3 |  |  |  |  |
|  | B4 |  |  |  |  |
| (C) Carbon nanotubes | C1 | 0.17 |  |  |  |
|  | C2 |  | 0.34 |  |  |
| Carbon black | C3 |  |  | 0.17 | 0.17 |
| (D) Dispersants | D1 |  |  |  | 0.85 |
|  | D2 |  |  |  |  |
|  | C3 |  |  |  |  |
|  | C4 |  |  |  |  |
| Value of α |  | 6.0 | 3.0 | 2.3 | 3.2 |

<Production of Varistors>

A substrate 12 which had comb-shaped electrodes 14a and 14b illustrated in FIG. 1 was used. The substrate 12 that was used was a copper-clad multilayer printed circuit board made of FR-4 material. The copper foil in the multilayer printed circuit board was patterned to form the electrodes 14a and 14b.

Figure 2:
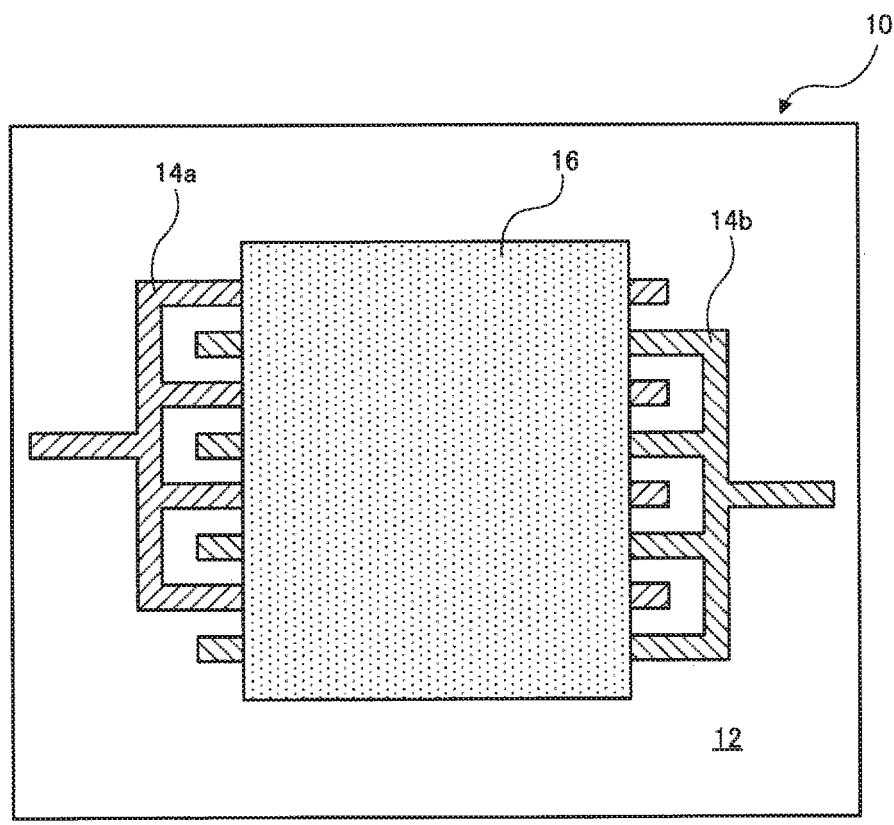
FIG. 2 is a plan view of a varistor.

Next, as illustrated in FIG. 2, the resin composition for forming a varistor 16 of Example or Comparative Example was applied by screen printing to cover the comb-shaped electrodes 14a and 14b on the surface of the substrate 12. The resin composition for forming a varistor 16 applied was covered with a polyimide film (not shown). Thereafter, the substrate 12 coated with the resin composition for forming a varistor 16 was heated at a temperature of 165° C. for 2 hours. A varistor 10 was thus produced. The thickness after curing of the resin composition for forming a varistor 16 was 90 μm.

<Measurement of Current-Voltage Characteristics of Varistors, and Calculation of Nonlinear Coefficients α>

Current-voltage characteristics were measured with respect to the varistors of Examples and Comparative Examples produced as described above. Specifically, a voltage was applied to the pair of electrodes (the electrode 14a and the electrode 14b) of the varistor, and the value of current that flowed was measured.

Figure 3:
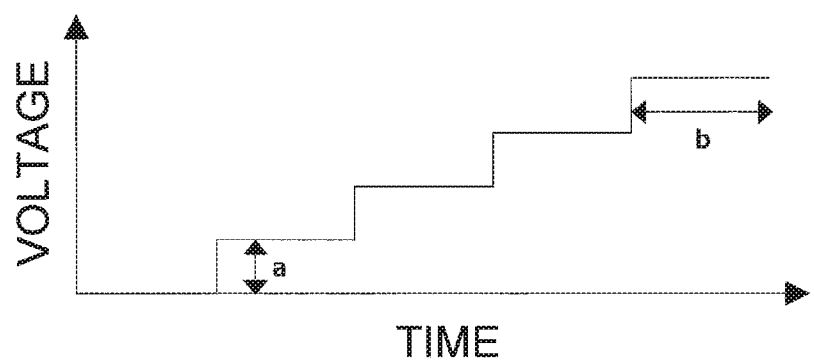
FIG. 3 is a graph showing the relationship between the magnitude of voltage applied to a pair of electrodes, and time.

FIG. 3 is a graph showing the relationship between the magnitude of the voltage applied to the pair of electrodes (the electrode 14a and the electrode 14b), and time. As shown in FIG. 3, the current-voltage characteristics of the varistor were measured while increasing the voltage applied to the pair of electrodes stepwise by 0.1 V (a=0.1 V). The amount of time for which each voltage was applied was set to 110 μsec (b=110 μsec). The maximum value of current flowing between the pair of electrodes was set to 0.12 mA.

Next, the nonlinear coefficient α was calculated from the data of current-voltage characteristics of the varistor. Specifically, the data of current-voltage characteristics of the varistor was analyzed with a simulator, and the values of K and α conforming to $I = K \cdot V^\alpha$ were determined by curve fitting. Tables 1 to 3 describe the results of the calculation of α in Examples and Comparative Examples.

As seen from the results shown in Tables 1 to 3, the varistors obtained by heating the resin compositions of Examples 1 to 15 had α>7.0 and attained good varistor characteristics. In contrast, the varistors obtained by heating the resin compositions of Comparative Examples 1 to 4 had α<7.0 and failed to attain good varistor characteristics.

Figure 4:
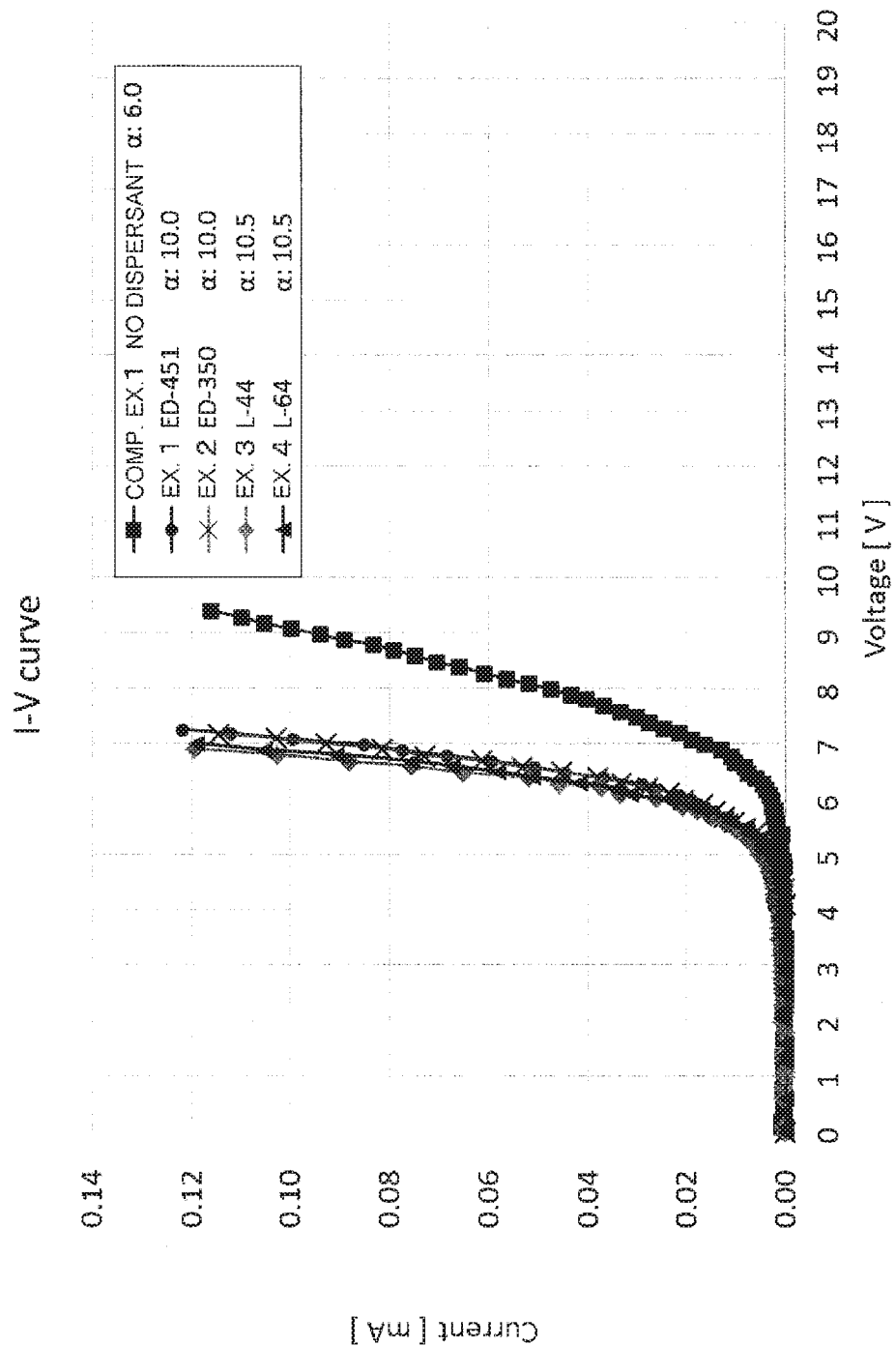
FIG. 4 is a graph showing the results of the measurement of current-voltage characteristics in Examples 1 to 4 and Comparative Example 1.

FIG. 4 is a graph showing the results of the measurement of current-voltage characteristics in Examples 1 to 4 and Comparative Example 1. As seen from FIG. 4, the varistors obtained by heating a resin composition which included a dispersant having a polyalkyl ether skeleton in the molecule had a higher value of α than the varistor obtained by heating a resin composition containing no dispersant. From these results, it has been shown that the varistors obtained by heating a resin composition which include a dispersant having a polyalkyl ether skeleton in the molecule have good nonlinearity.

Figure 5:
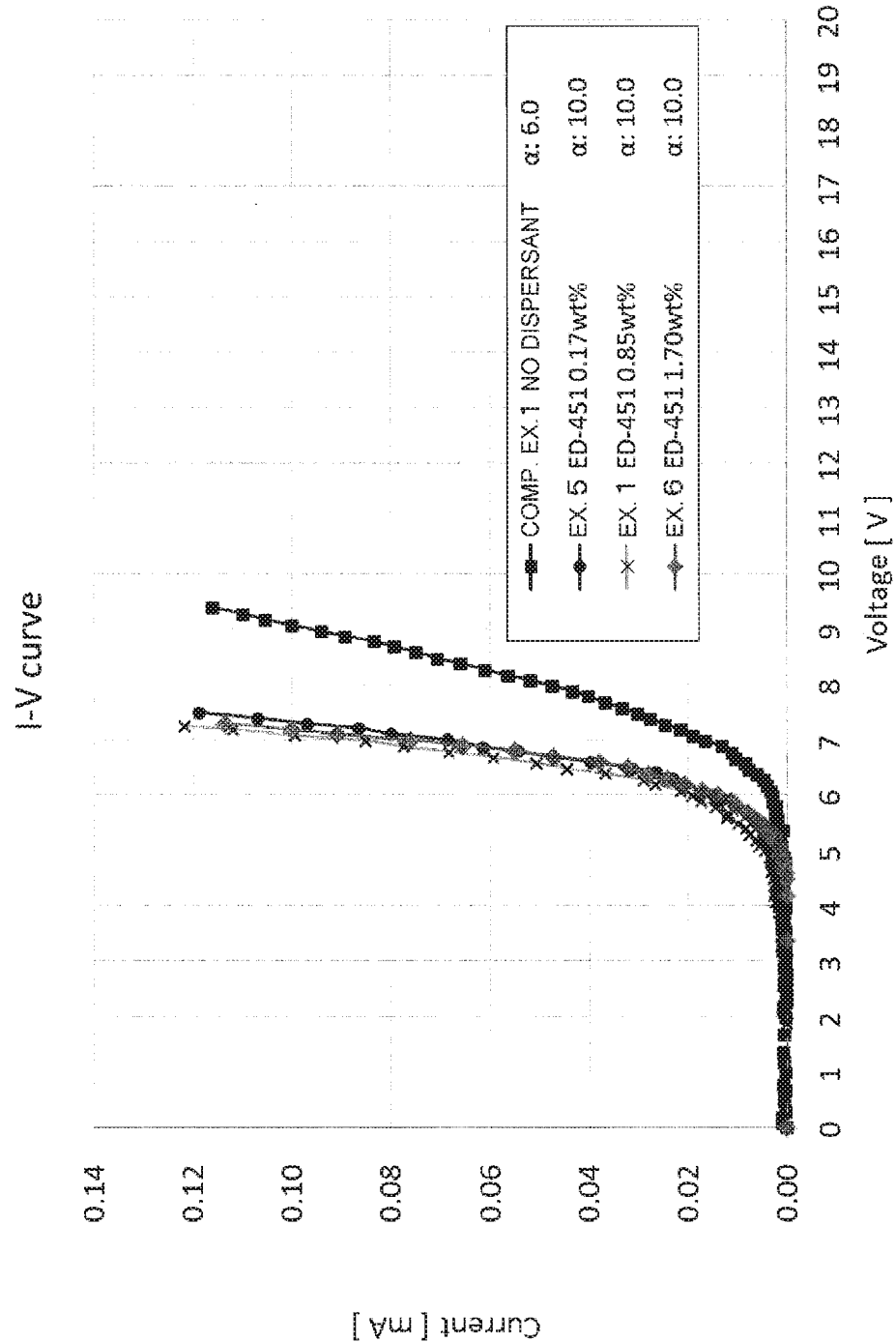
FIG. 5 is a graph showing the results of the measurement of current-voltage characteristics in Examples 1, 5 and 6, and Comparative Example 1.

FIG. 5 is a graph showing the results of the measurement of current-voltage characteristics in Examples 1, 5 and 6, and Comparative Example 1. As seen from FIG. 5, the varistors obtained by heating a resin composition containing 0.17 to 1.70 parts by weight of a dispersant having a polyalkyl ether skeleton in the molecule with respect to 100 parts by weight of an epoxy resin had a higher value of α than the varistor obtained by heating a resin composition containing no dispersant.

Figure 6:
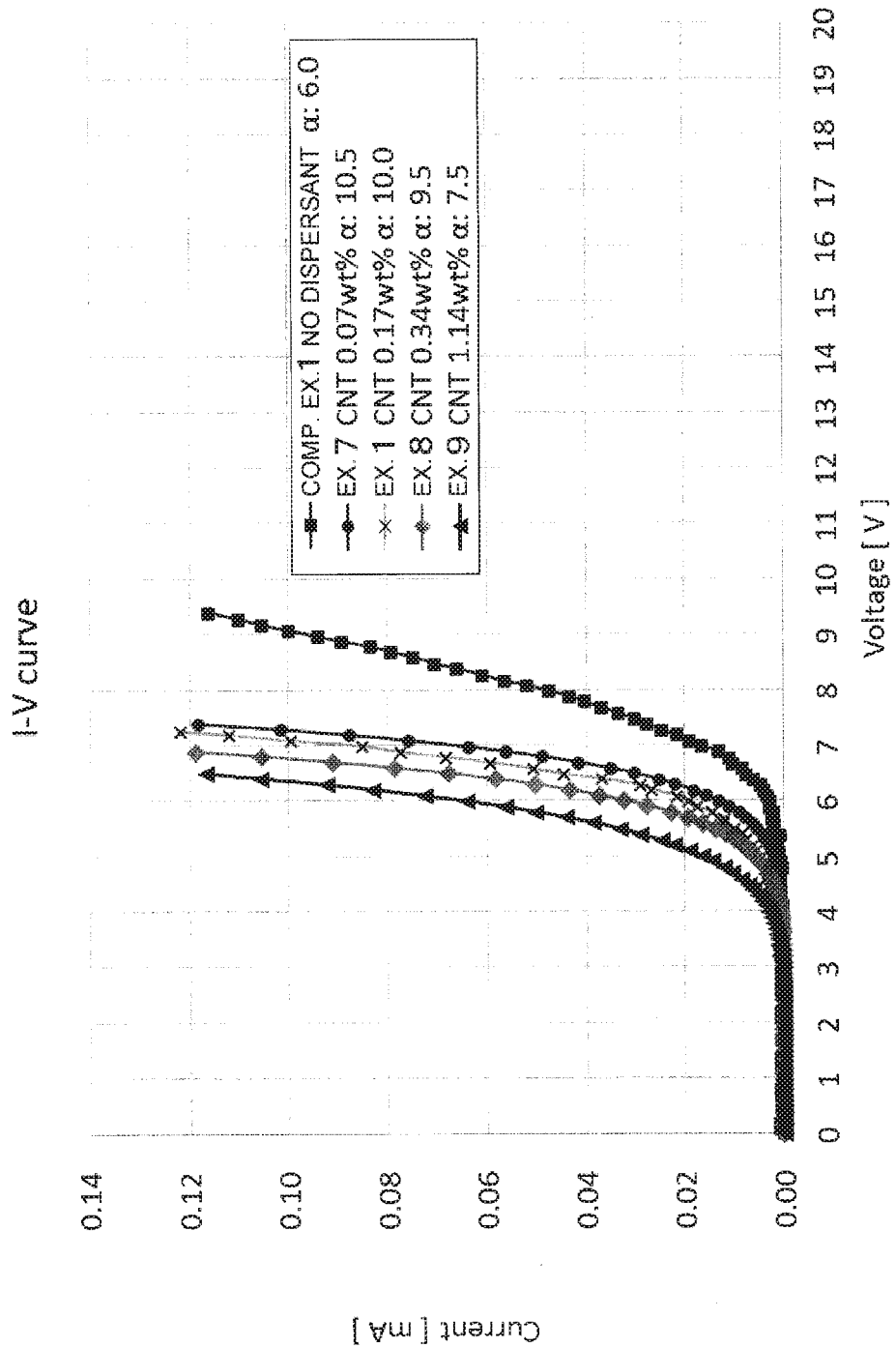
FIG. 6 is a graph showing the results of the measurement of current-voltage characteristics in Examples 1, 7, 8 and 9, and Comparative Example 1.

FIG. 6 is a graph showing the results of the measurement of current-voltage characteristics in Examples 1, 7, 8 and 9, and Comparative Example 1. As seen from FIG. 6, the varistors obtained by heating a resin composition which included a dispersant having a polyalkyl ether skeleton in the molecule had a higher value of α than the varistor obtained by heating a resin composition containing no dispersant. This effect was observed at least in the range of the content of the carbon nanotubes from 0.07 to 1.14 parts by weight with respect to 100 parts by weight of the epoxy resin.

Figure 7:
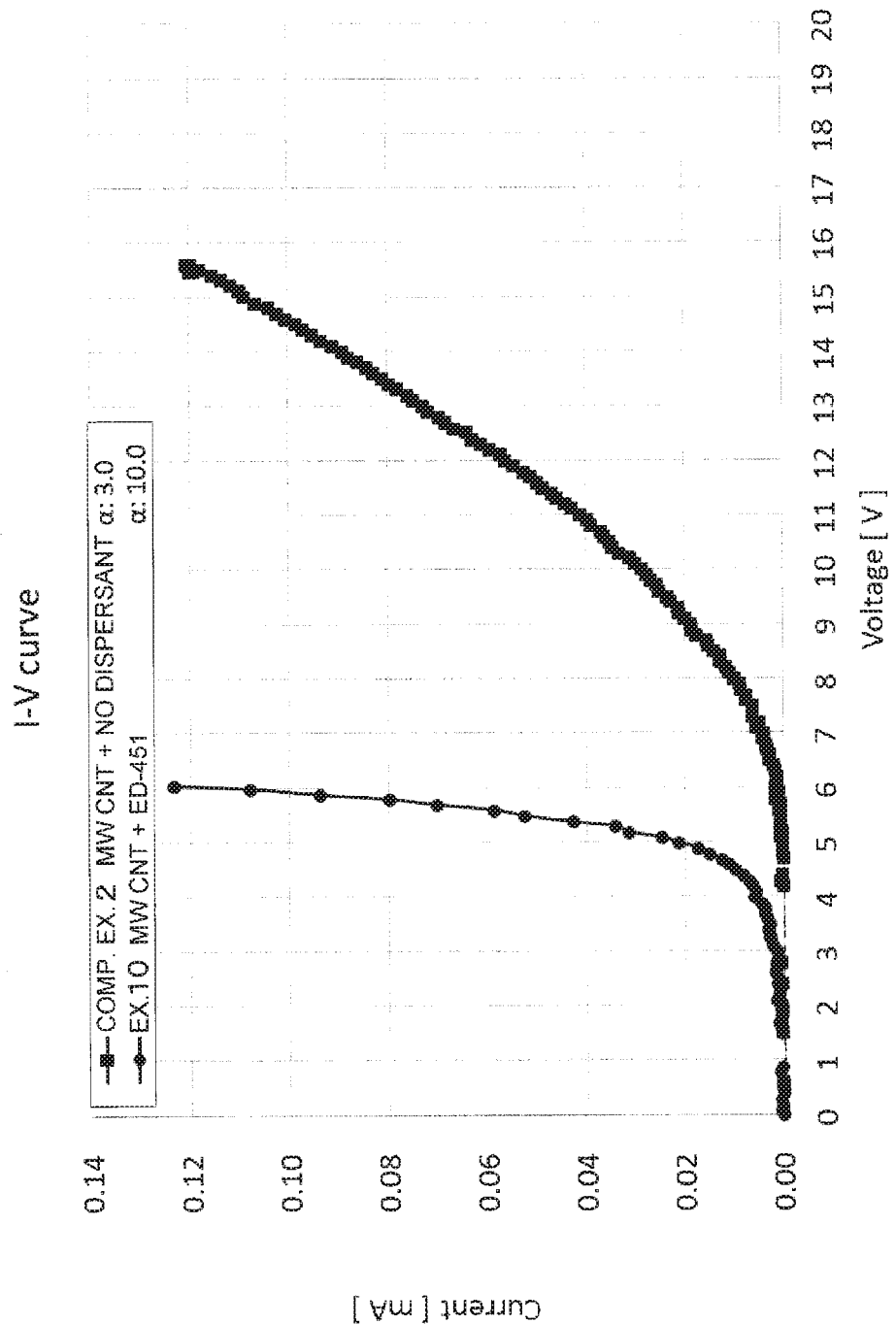
FIG. 7 is a graph showing the results of the measurement of current-voltage characteristics in Example 10 and Comparative Example 2.

FIG. 7 is a graph showing the results of the measurement of current-voltage characteristics in Example 10 and Comparative Example 2. As seen from FIG. 7, the varistor obtained by heating a resin composition which included a dispersant having a polyalkyl ether skeleton in the molecule and multi-walled carbon nanotubes had a higher value of α than the varistor obtained by heating a resin composition which included multi-walled carbon tubes but no dispersant. From these results, it has been shown that the resin compositions for forming varistors which include a dispersant having a polyalkyl ether skeleton in the molecule have excellent characteristics as varistor-forming materials regardless of whether the carbon nanotubes are single-walled or multi-walled.

Figure 8:
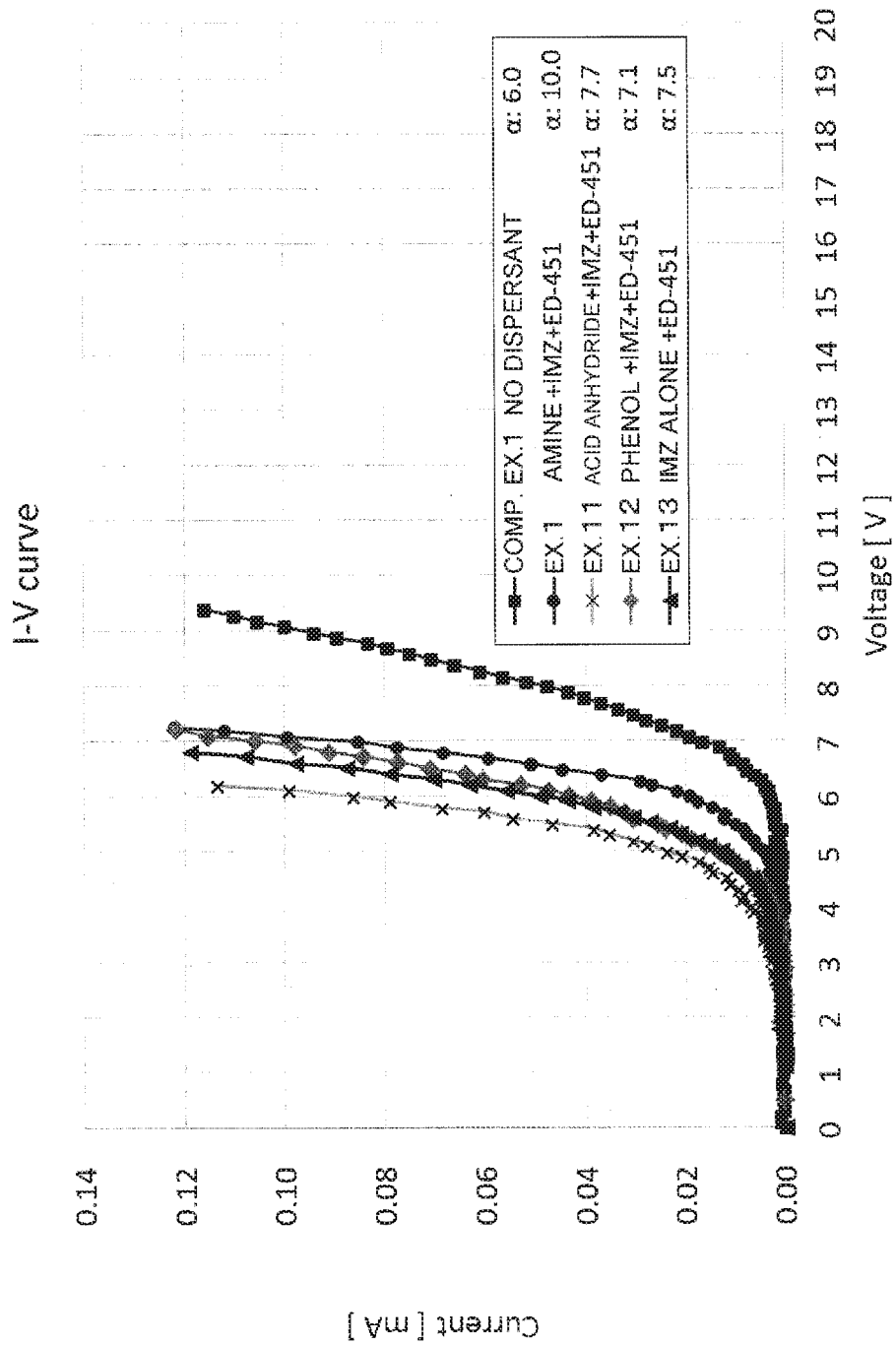
FIG. 8 is a graph showing the results of the measurement of current-voltage characteristics in Examples 1, 11, 12 and 13, and Comparative Example 1.

FIG. 8 is a graph showing the results of the measurement of current-voltage characteristics in Examples 1, 11, 12 and 13, and Comparative Example 1. As seen from FIG. 8, the varistors obtained by heating a resin composition which included a dispersant having a polyalkyl ether skeleton in the molecule had a high value of α in each of the cases where the curing agents contained therein were an amine curing agent, an imidazole curing agent, phenol and an acid anhydride. From these results, it has been shown that the resin composition for forming varistors which include a dispersant having a polyalkyl ether skeleton in the molecule have excellent characteristics as varistor-forming materials regardless of the type of the curing agent.

Figure 9:
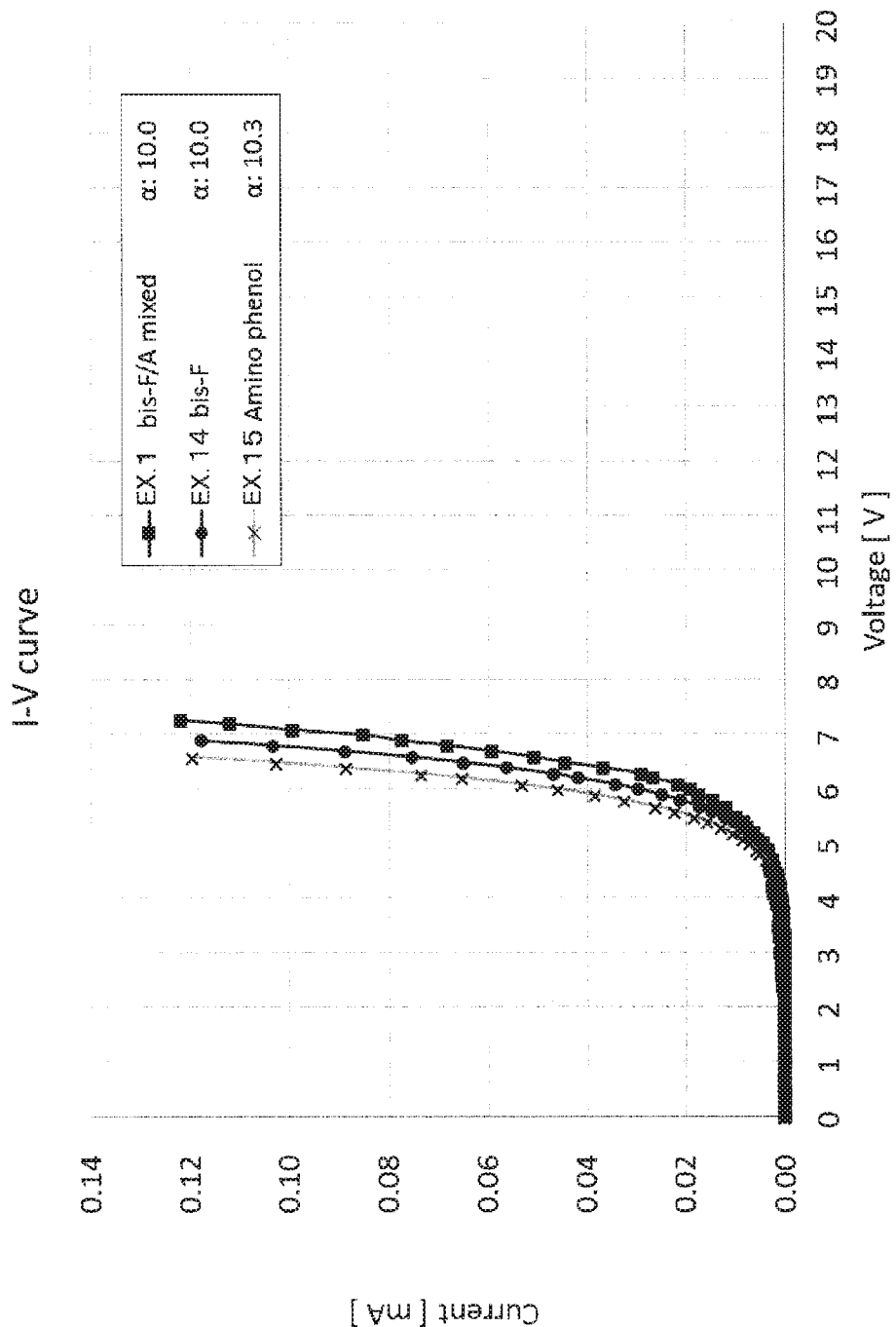
FIG. 9 is a graph showing the results of the measurement of current-voltage characteristics in Examples 1, 14 and 15.

FIG. 9 is a graph showing the results of the measurement of current-voltage characteristics in Examples 1, 14 and 15. As seen from FIG. 9, the varistors obtained by heating a resin composition which included a dispersant having a polyalkyl ether skeleton in the molecule had a high value of α in each of the cases where each of the epoxy resins used therein was one of a bisphenol F epoxy resin, a bisphenol A epoxy resin and an aminophenol epoxy resin. From these results, it has been shown that the resin compositions for forming varistors which include a dispersant having a poly-alkyl ether skeleton in the molecule have excellent characteristics as varistor-forming materials regardless of the type of the epoxy resin.

Figure 10:
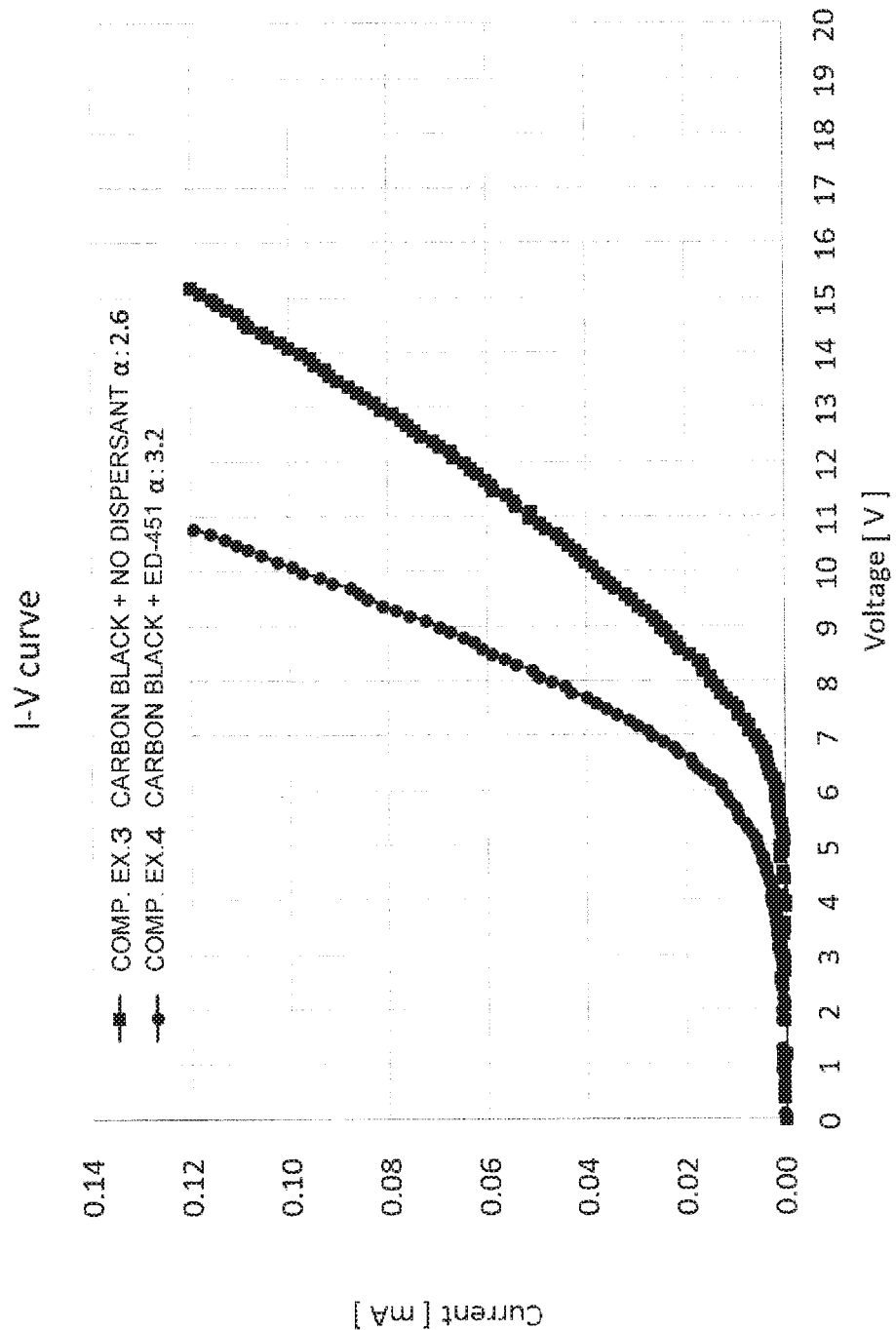
FIG. 10 is a graph showing the results of the measurement of current-voltage characteristics in Comparative Examples 3 and 4.

FIG. 10 is a graph showing the results of the measurement of current-voltage characteristics in Comparative Examples 3 and 4. As seen from FIG. 10, the varistor obtained by heating a resin composition containing carbon black did not have a high value of α. Further, the varistor obtained by heating a resin composition which included carbon black and a dispersant having a polyalkyl ether skeleton in the molecule did not have a high value of α. From these results, it has been shown that the nonlinearity is not improved and the advantageous effects of the present invention cannot be obtained when carbon black is used in place of the carbon nanotubes.

DESCRIPTION OF THE REFERENCE NUMERALS

10 VARISTOR
12 SUBSTRATE
14a, 14b ELECTRODES
16 RESIN COMPOSITION FOR FORMING VARISTOR

The invention claimed is:
1. A resin composition for forming a varistor comprising:
(A) an epoxy resin,
(B) a curing agent,
(C) carbon nanotubes, and
(D) a dispersant,
wherein the carbon nanotubes (C) comprise isolated single-walled semiconducting carbon nanotubes.
2. The resin composition for forming a varistor according to claim 1, wherein the epoxy resin (A) comprises at least one selected from the group consisting of bisphenol A epoxy resins, brominated bisphenol A epoxy resins, bisphenol F epoxy resins, aminophenol epoxy resins, biphenyl epoxy resins, novolak epoxy resins, alicyclic epoxy resins, naphthalene epoxy resins, ether epoxy resins, polyether epoxy resins and silicone epoxy copolymer resins.
3. The resin composition for forming a varistor according to claim 1, wherein the curing agent (B) comprises at least one selected from the group consisting of amine compounds, phenols, acid anhydrides and imidazole compounds.
4. The resin composition for forming a varistor according to claim 1, wherein the carbon nanotubes (C) further comprise multi-walled carbon nanotubes.
5. The resin composition for forming a varistor according to claim 1, wherein the carbon nanotubes (C) consist of isolated single-walled semiconducting carbon nanotubes.
6. The resin composition for forming a varistor according to claim 1, wherein the resin composition includes the carbon nanotubes (C) in an amount of 0.05 to 2 parts by weight with respect to 100 parts by weight of the epoxy resin (A).
7. The resin composition for forming a varistor according to claim 1, wherein the dispersant (D) comprises at least one selected from the group consisting of anionic surfactants, cationic surfactants, amphoteric surfactants, nonionic surfactants, hydrocarbon surfactants, fluorine surfactants, silicon surfactants, polycarboxylic acids, polyether carboxylic acids, polycarboxylic acid salts, alkylsulfonic acid salts, alkylbenzenesulfonic acid salts, alkyl ether sulfonic acid salts, aromatic polymers, organic conductive polymers, polyalkyl oxide surfactants, inorganic salts, organic acid salts and aliphatic alcohols.

8. The resin composition for forming a varistor according to claim 7, wherein the dispersant (D) comprises a polyalkyl oxide surfactant, and the polyalkyl oxide surfactant has a polyalkyl ether skeleton in the molecule.

9. A varistor comprising a cured product of the resin composition for forming a varistor according to claim 1.

* * * * *